United States Patent
Malach et al.

(10) Patent No.: US 11,755,918 B2
(45) Date of Patent: *Sep. 12, 2023

(54) FAST CNN CLASSIFICATION OF MULTI-FRAME SEMANTIC SIGNALS

(71) Applicant: Mobileye Vision Technologies Ltd., Jerusalem (IL)

(72) Inventors: Eran Malach, Jerusalem (IL); Yaakov Shambik, Jerusalem (IL); Jacob Bentolila, Koranit (IL); Idan Geller, Tel Aviv (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,404

(22) Filed: Nov. 4, 2021

(65) Prior Publication Data

US 2022/0058453 A1 Feb. 24, 2022

Related U.S. Application Data

(63) Continuation of application No. 16/685,925, filed on Nov. 15, 2019, now Pat. No. 11,200,468.

(Continued)

(51) Int. Cl.
*G06K 9/00* (2022.01)
*G06N 3/084* (2023.01)
(Continued)

(52) U.S. Cl.
CPC ............. *G06N 3/084* (2013.01); *B60R 11/04* (2013.01); *G05D 1/0088* (2013.01);
(Continued)

(58) Field of Classification Search
CPC .... G06V 30/274; G06V 20/56; G06V 10/454; G06V 10/50; G06V 10/82; G06V 20/584;
(Continued)

(56) References Cited

U.S. PATENT DOCUMENTS 9,632,502 B1 * 4/2017 Levinson ............... H04L 67/10
11,200,468 B2 12/2021 Malach et al.
(Continued)

FOREIGN PATENT DOCUMENTS

| CN | 108734979 | 11/2018 |
|---|---|---|
| CN | 113614730 | 11/2021 |

(Continued)

OTHER PUBLICATIONS

"APML—Project Lifecycle", Mobileye An Intel Company, 56 pgs.
(Continued)

*Primary Examiner* — Charlotte M Baker
(74) *Attorney, Agent, or Firm* — Schwegman Lundberg & Woessner, P.A.

(57) ABSTRACT

The present subject matter provides various technical solutions to technical problems facing advanced driver assistance systems (ADAS) and autonomous vehicle (AV) systems. In particular, disclosed embodiments provide systems and methods that may use cameras and other sensors to detect objects and events and identify them as predefined signal classifiers, such as detecting and identifying a red stoplight. These signal classifiers are used within ADAS and AV systems to control the vehicle or alert a vehicle operator based on the type of signal. These ADAS and AV systems may provide full vehicle operation without requiring human input. The embodiments disclosed herein provide systems and methods that can be used as part of or in combination with ADAS and AV systems.

25 Claims, 7 Drawing Sheets

Related U.S. Application Data

(60) Provisional application No. 62/767,785, filed on Nov. 15, 2018.

(51) Int. Cl.

| | | |
|---|---|---|
| *B60R 11/04* | (2006.01) | |
| *G05D 1/00* | (2006.01) | |
| *G05D 1/02* | (2020.01) | |
| *G06N 3/04* | (2023.01) | |
| *G06V 30/262* | (2022.01) | |
| *G06V 20/56* | (2022.01) | |
| *G06F 18/24* | (2023.01) | |
| *G06F 18/21* | (2023.01) | |
| *G06V 30/19* | (2022.01) | |
| *G06V 10/82* | (2022.01) | |
| *G06V 10/44* | (2022.01) | |
| *G06V 10/50* | (2022.01) | |
| *G06V 20/58* | (2022.01) | |

(52) U.S. Cl.
CPC ......... *G05D 1/0246* (2013.01); *G06F 18/217* (2023.01); *G06F 18/24* (2023.01); *G06N 3/04* (2013.01); *G06V 10/454* (2022.01); *G06V 10/50* (2022.01); *G06V 10/82* (2022.01); *G06V 20/56* (2022.01); *G06V 20/584* (2022.01); *G06V 30/19173* (2022.01); *G06V 30/274* (2022.01); *B60R 2300/8086* (2013.01)

(58) Field of Classification Search
CPC .............. G06V 30/19173; B60R 11/04; B60R 2300/8086; G05D 1/0088; G05D 1/0246; G06K 9/6262; G06K 9/6267; G06K 9/6273; G06N 3/04; G06N 3/0445; G06N 7/005; G06N 3/084; G06N 3/0454; G06N 3/045; G06N 3/044; G06N 7/01; B60Q 1/34; B60Q 1/44; G06F 18/217; G06F 18/24; G06F 18/2414
USPC ........................................................ 382/104
See application file for complete search history.

(56) References Cited

U.S. PATENT DOCUMENTS

| | | | |
|---|---|---|---|
| 2012/0219174 A1 | 8/2012 | Wu | |
| 2017/0174261 A1 | 6/2017 | Micks et al. | |
| 2018/0126902 A1 | 5/2018 | Seo et al. | |
| 2018/0314253 A1 | 11/2018 | Mercep et al. | |
| 2020/0160126 A1 | 5/2020 | Malach et al. | |
| 2021/0142491 A1* | 5/2021 | Brown | G05D 1/0221 |

FOREIGN PATENT DOCUMENTS

| | | |
|---|---|---|
| KR | 101165359 B1 | 7/2012 |
| WO | WO-2020099936 A2 | 5/2020 |
| WO | WO-2020099936 A3 | 6/2020 |

OTHER PUBLICATIONS

"U.S. Appl. No. 16/685,925, Non Final Office Action dated Jun. 4, 2021", 24 pgs.

"U.S. Appl. No. 16/685,925, Notice of Allowance dated Jul. 30, 2021", 8 pgs.

"U.S. Appl. No. 16/685,925, Response filed Jul. 21, 2021 to Non Final Office Action dated Jun. 4, 2021", 10 pgs.

"International Application Serial No. PCT/IB2019/001293, International Preliminary Report on Patentability dated May 27, 2021", 12 pgs.

"Internationjal Application Serial No. PCT/IB2019/001293, International Search Report dated May 14, 2020", 5 pgs.

"Internationjal Application Serial No. PCT/IB2019/001293, Written Opinion dated May 14, 2020", 10 pgs.

Han-Kai, Hsu, et al., "Learning to Tell Brake and Turn Signals in Videos Using CNN-LSTM Structure", 2017 IEEE 20th International Conference On Intelligent Transportation Systems (ITSC), IEEE, (Oct. 16, 2017), 1-6.

Liu, F, et al., "Finding Periodicity in Space and Time", 6th International Conference On Computer Vision. ICCV '98. Bombay, (Jan. 4, 1998), 376-383.

Nakanishi, T, et al., "Automatic Vehicle Image Extraction Based On Spatio-Temporal Image Analysis", Pattern Recognition, 1992. vol. 1. Conference A: Computer Vision and Applications, Proceedings., 11th IAPR International Conference On the Hague, Netherlands Aug. 30-Sep. 3, 1992, Los Alamitos, CA, USA,IEEE Comput. Soc, US, (Aug. 30, 1992), 500-504.

"Chinese Application Serial No. 201980087354.5, Office Action dated Feb. 28, 2022", w English Translation, 16 pgs.

"Chinese Application Serial No. 201980087354.5, Response filed Jul. 15, 2022 to Office Action dated Feb. 28, 2022", w English claims, 9 pgs.

"Japanese Application Serial No. 2021-526679, Voluntary Amendment filed Nov. 14, 2022", w English claims, 8 pgs.

"Chinese Application Serial No. 201980087354.5, Voluntary Amendment filed Dec. 28, 2021", w English claims, 18 pgs.

"European Application Serial No. 19850793.1, Response to Communication Pursuant to Rules 161 and 162 EPC filed Dec. 13, 2021", 80 pgs.

"European Application Serial No. 19850793.1, Communication Pursuant to Article 94(3) EPC dated Apr. 4, 2023", 6 pgs.

"Korean Application Serial No. 10-2021-7018356, Notice of Preliminary Rejection dated Feb. 10, 2023", w/ English Translation, 17 pgs.

"Korean Application Serial No. 10-2021-7018356, Voluntary Amendment filed Nov. 15, 2022", w/ English claims, 28 pgs.

Takeshi, Saitoh, et al., "Concatenated Frame Image Based CNN for Visual Speech Recognition", In: Chen Cs et al. (EDS): Computer Vision—ACCV 2016 Workshop, Part II, Lecture Notes in Computer Science, vol. 10117, (Mar. 16, 2017), 13 pgs.

* cited by examiner

FAST CNN CLASSIFICATION OF MULTI-FRAME SEMANTIC SIGNALS

RELATED APPLICATION AND PRIORITY CLAIM

This application is a continuation of U.S. patent application Ser. No. 16/685,925, filed Nov. 15, 2019, which is related and claims priority to U.S. Provisional Application Ser. No. 62/767,785, filed on Nov. 15, 2018 and entitled "FAST CNN CLASSIFICATION OF MULTI-FRAME SEMANTIC SIGNALS," the entirety of which is incorporated herein by reference.

BACKGROUND

Advanced driver assistance systems (ADAS) and autonomous vehicle (AV) systems use cameras and other sensors to provide partial or fully autonomous vehicle navigation. The cameras and sensors provide input to the ADAS or AV system, which are used to identify other vehicles, vehicle lanes, or other navigation environment features. As ADAS and AV systems progress towards fully autonomous operation, it would be beneficial to improve identification and classification of computer vision inputs.

SUMMARY

Disclosed embodiments provide systems and methods that can be used as part of or in combination with ADAS and AV systems. These ADAS and AV systems may use cameras and other sensors to detect objects and events and identify them as predefined signal classifiers, such as detecting and identifying a red stoplight. These signal classifiers are used within ADAS and AV systems to control the vehicle or alert a vehicle operator based on the type of signal. These ADAS and AV systems may provide full vehicle operation without requiring human input. The embodiments disclosed herein provide systems and methods that can be used as part of or in combination with ADAS and AV systems. ADAS technology may include any suitable technology to assist drivers in the navigation or control of their vehicles, such as forward collision warning (FCW), lane departure warning (LDW), traffic signal recognition (TSR), or other partially autonomous driver assist technology.

Human vehicle operators react to similar inputs, such as a person visually identifying a red stoplight and applying a brake to stop the vehicle. However, human vehicle operators rely on subjective determinations to identify lights and manipulate vehicle controls. In contrast, the present disclosure provides systems and methods that apply a set of rules defined by a trained system that was trained using machine learning algorithms, such as a convolutional neural network (CNN), for example, to identify signal classifiers based on inputs from cameras and other sensors. This technical solution enables the automation of specific vehicular operation tasks that previously could not be automated. In some embodiments, systems and methods of the present disclosure can be used to alert a vehicle driver (e.g. vehicle operator), such as to improve the safety or efficiency of operation of the vehicle.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
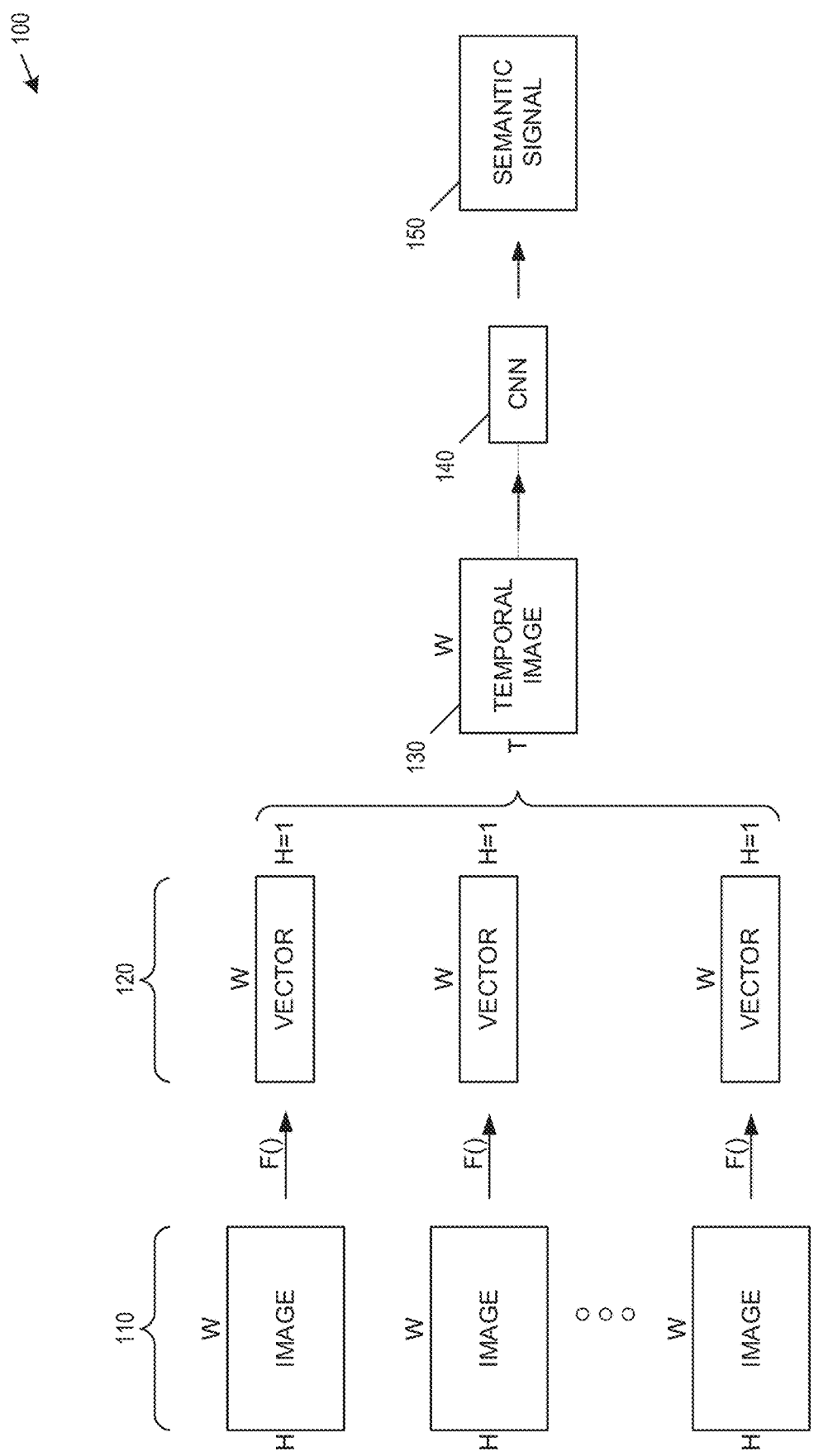
FIG. 1 is a block diagram representation of a method, according to an example embodiment.

The system may be arranged to process images of an environment ahead of a vehicle navigating a road for training a neural network or deep learning algorithms, such as a convolutional neural network (CNN), to detect and classify a multi-frame signal within the context of the signal (e.g., a multi-frame semantic signal). An example multi-frame semantic signal includes vehicle light indicators (VLI), where the task is to identify the state of vehicle based of its light indicators (e.g., blinking lights, braking lights, hazard lights). Multi-frame semantic signals may also include emergency vehicle lights (e.g., flashing lights on emergency vehicles), construction signage lights (e.g., for detour management), traffic light state classification (e.g., green/yellow/red light, blinking green/yellow/red, blinking arrows, etc.), or other time-varying visual signals. The semantic signal may be used to identify a vehicle maneuver, detect presence of special vehicles in the environment of the host vehicle (e.g., emergency vehicles), identify a state or behavior of a road signage indicator (such as a traffic light), or identify other nearby signals or vehicles. In examples of the present disclosure, the multi-frame semantic signal may relate to a signal that is generated from a plurality of frames captured over a period of time by one or more sensors onboard the host vehicle. In various embodiments, the plurality of frames is used to create a signal signature, and the signature is processed to characterize the signal. The results of such processing can be used to generate a vehicle control signal in response to the signal, such as notifying a vehicle operator or generating a vehicle braking control signal. In some embodiments, a vehicle control system may be used to receive the vehicle control signal and execute the identified vehicle maneuver or issue an appropriate alert.

However, it would be appreciated that embodiments of the present disclosure are not limited to scenarios where a semantic signal is caused by a light. The semantic signal identification can be associated with various other circumstances and can result from other types of image data and also from data that is not image based or is not exclusively image based, such as audible information. In some embodiments, multi-frame semantic signals may also include detection of audible signals, such as police sirens or emergency vehicle sirens.

The systems and methods described herein include application of a convolutional neural network (CNN) to provide detection and classification of a multi-frame semantic signal to identify signal classifiers based on inputs from cameras and other sensors. The inputs may be analyzed or matched against predefined signal characteristics, such as by matching against a database of signal characteristics. The inputs may be used to identify, analyze, or predict an event, a sequence of events, an object, a behavior of an object (e.g., driving pattern based on object motion sequence), or other object or event characteristic.

This application of a CNN is based on an artificial intelligence (AI) analysis of the inputs. As used herein, AI analysis is a field concerned with developing decision-making systems to perform cognitive tasks that have traditionally required a living actor, such as a person. The CNN is a type of artificial neural network (ANN) algorithm where an ANN includes a computational structure that may be loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented (e.g., implemented) as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then the value is usually not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers may not know which weights will work for a given application. ANN designers typically choose a number of neuron layers or specific connections between layers including circular connection, but the ANN designer does may not know which weights will work for a given application. Instead, a training process is used to arrive at appropriate weights. However, determining correct synapse weights is common to most ANNs. The training process proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

The semantic signal detection and classification describe herein may be based on application of deep neural networks (DNNs) to classification of multi-frame image sequences. DNN architectures for dealing with sequential data may include variants of Recurrent Neural Networks (RNNs) and 3-D CNNS. While RNNs are considered by some to perform well on Natural Language Processing (NLP) tasks, some consider RNNs to be less effective in capturing the spatial structure of images, so RNNs are typically not widely used on image sequences. Additionally, variants of RNNs use convolution, however these are typically not widely used as they involve implementing a complicated architecture and often provide inferior results.

The use of a 3-D CNN addresses some of the failings of the RNNs. For example, the 3-D CNN provides a straight-forward architecture for processing sequential image data and often gives superior performance relative to RNNs. However, full 3-D convolutions are computationally expensive, which makes full 3-D convolutions unfavorable for real-time applications, such as autonomous driving. For example, full 3-D convolutions often include saving long sequences of images, which requires considerable memory space and significantly increases computational cost due to processing 3-D data (e.g., multidimensional matrix data).

In contrast to the use of full 3-D convolutions, the present technical solution processes sequential images to generate a temporal image while maintaining the spatio-temporal structure of the whole sequence of images. By maintaining the spatio-temporal structure, this technical solution enjoys advantages of using full 3-D convolutions at a significantly reduced memory space requirement and significantly reduced computational cost.

The methods according to examples of the presently disclosed subject matter may be implemented in one or more of the various possible implementations and configurations of a vehicle mountable system described herein. In some embodiments, various examples of the system can be mounted in a vehicle and can be operated while the vehicle is in motion. In some embodiments, the system can implement the methods according to examples of the presently disclosed subject matter.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a block diagram representation of a method 100, according to an example embodiment. Method 100 includes receiving a plurality of input images 110. In various examples, the images 110 may include a sequence of images of vehicle brake lights shown in FIG. 2, or may include the sequence of images of a vehicle turn signal shown in FIG. 3.

Method 100 includes mapping each of the plurality of images 110 to a corresponding plurality of vectors 120. The plurality of images 110 are 2-D representations of an environment (e.g., a 3-D environment) of the host vehicle in a field-of-view (FOV) of the camera that was used to capture the images. For example, the 2-D plurality of images 110 can be created using a sensor that includes a 2-D array of image pixels and additional image capture circuitry.

The mapping of the plurality of images 110 to a corresponding plurality of vectors 120 may be executed such that vectors 120 maintain the spatial structure of the original images 110 along one of its axes. Thus, each of the plurality of vectors 120 provides a 1-D representation created from a corresponding source 2-D image. In the example shown in FIG. 1, vectors 120 may include row vectors, where each of the row vectors 120 is of the same width "W" as each of the corresponding images 110. The mappings of images 110 to vectors 120 may include operations that computer vision hardware is able to execute efficiently, such as calculating a mean value, a median value, or maximal value along each column of the image.

Method 100 includes concatenating vectors 120 into a new temporal image 130. This provides a 2-D image temporal image 130 that is comprised of all of the plurality of vectors 120 or a representative number of the plurality of vectors 120 (e.g., a statistically representative sampling). Temporal image 130 may be of the same width "W" as the vectors 120 and images 110, but include a height "T" equal to the number of source images. Method 100 includes feeding temporal image 130 into a convolutional neural network (CNN) 140 to identify a semantic signal 150.

Because the rows of temporal image 130 maintain the spatial structure of the original images, the temporal image 130 fed into the CNN 140 maintains the spatio-temporal structure of the whole sequence of images 110. By maintaining the spatio-temporal structure, the use of the temporal image 130 in the CNN 140, this provides the same advantages of using full 3-D convolutions at a significantly reduced memory space requirement and significantly reduced computational cost. In an example, by maintaining the spatio-temporal structure, the present solution provides a memory and computational cost that is similar to 2-D CNNs.

Figure 2:
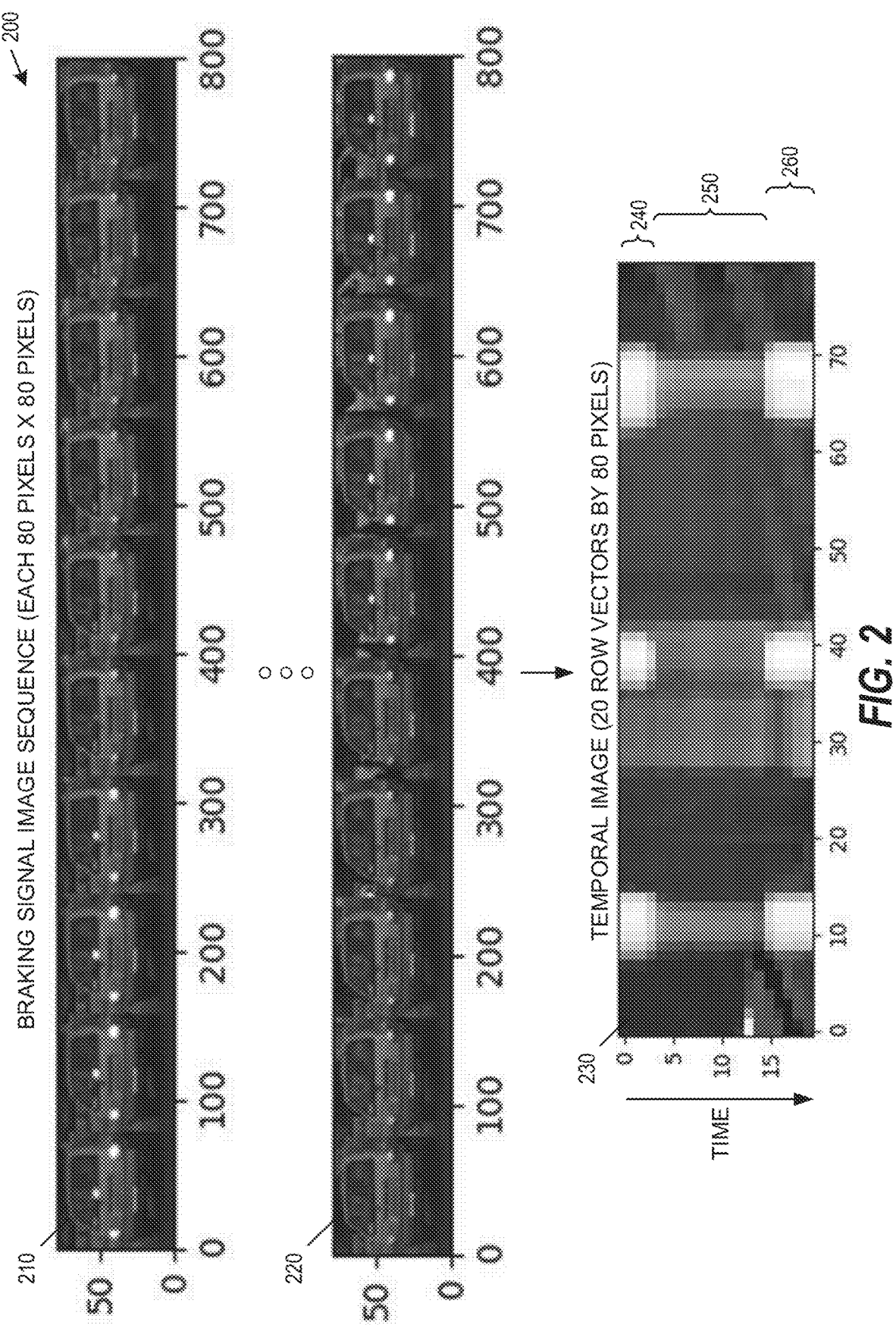
FIG. 2 is a block diagram representation of image mapping, according to an example embodiment.

FIG. 2 is a block diagram representation of image mapping 200, according to an example embodiment. Image mapping 200 may be based on a received set of sequential images 210 and 220. As shown in FIG. 2, images 210 and 220 together form twenty sequential images of three brake lights on a vehicle transitioning from on to off and back on again. Each of the twenty sequential images 210 and 220 may be mapped to a corresponding plurality of row vectors using a column-wise max operator and concatenated into a temporal image 230. For example, the topmost row in temporal image 230 is the row vector that represents the output of the column-wise max operator applied to the first sequential image, and subsequent rows represent the progression of the twenty sequential images 210 and 220 over time. In the embodiment shown in FIG. 2, each of the twenty sequential images 210 and 220 are eighty pixels in height by eighty pixels in width, each row vector is one pixel in height by eighty pixels in width, and the temporal image 230 is twenty pixels in height (one for each row vector) by eighty pixels in width. Temporal image 230 may include multiple temporal sub-regions, such as a first region 240 where the brake lights are on, a second region 250 where the brake lights are off, and a third region 260 where the brake lights are back on. Temporal image 230 is subsequently fed into a CNN for signal classification, such as to identify when a vehicle is applying, releasing, and reapplying vehicle brakes.

Figure 3:
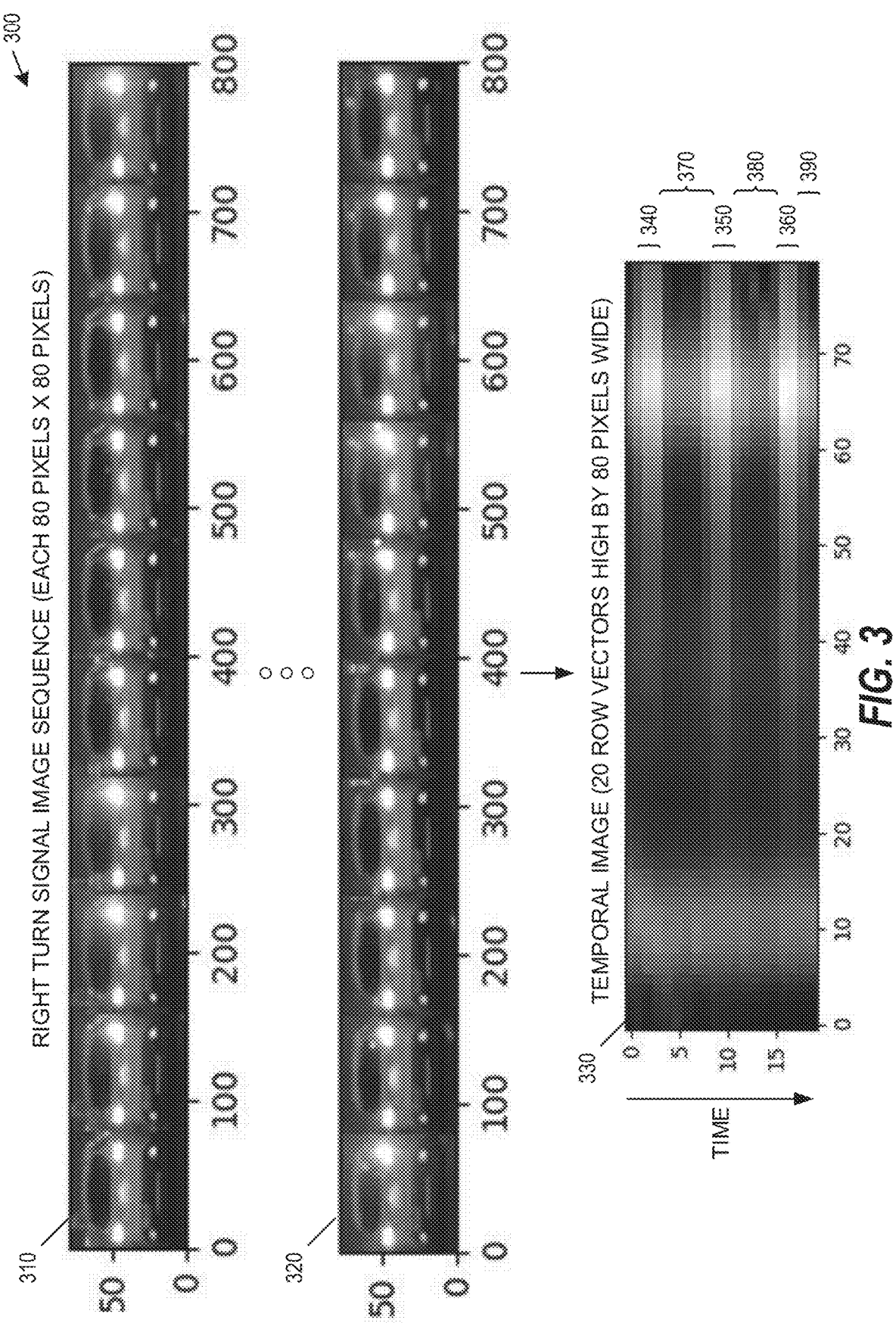
FIG. 3 is a block diagram representation of image mapping, according to an example embodiment.

FIG. 3 is a block diagram representation of image mapping 300, according to an example embodiment. Image mapping 300 may be based on a received set of sequential images 310 and 320. As shown in FIG. 3, images 310 and 320 together form twenty sequential images of a right turn signal flashing. Each of the twenty sequential images 310 and 320 may be mapped to a corresponding plurality of row vectors using a column-wise max operator and concatenated into a temporal image 330. For example, the topmost row in temporal image 330 is the row vector that represents the output of the column-wise max operator applied to the first sequential image, and subsequent rows represent the progression of the twenty sequential images 310 and 320 over time. In the embodiment shown in FIG. 3, each of the twenty sequential images 310 and 320 are eighty pixels in height by eighty pixels in width, each row vector is one pixel in height by eighty pixels in width, and the temporal image 330 is twenty pixels in height (one for each row vector) by eighty pixels in width. Temporal image 330 may include multiple temporal sub-regions, such as regions 340, 350, and 360 where the turn signal is on, and regions 370, 380, and 390 where the turn signal is off. Temporal image 330 is subsequently fed into a CNN for signal classification, such as to identify when a vehicle is signaling a turn.

Figure 4:
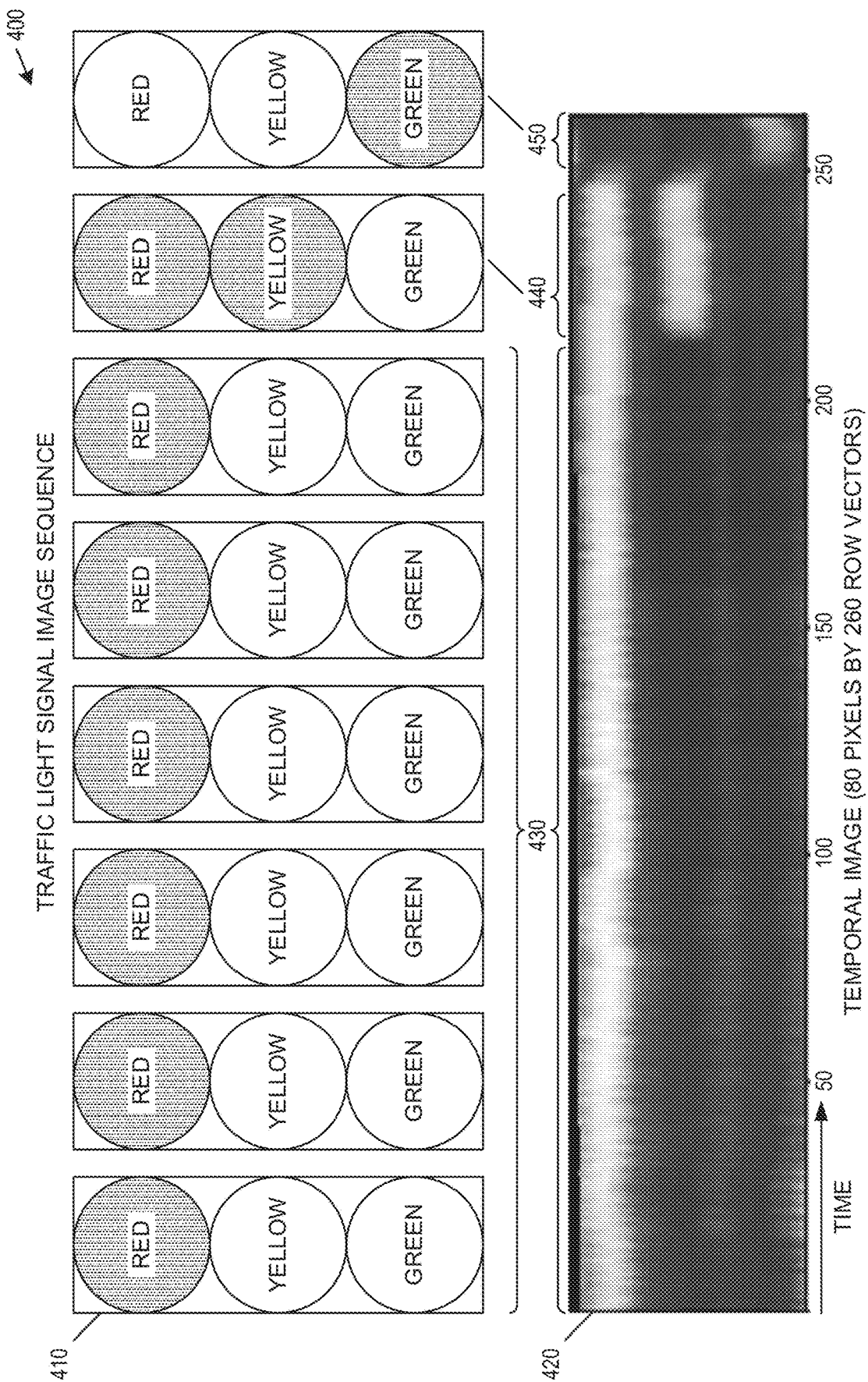
FIG. 4 is a block diagram representation of a system, according to an example embodiment.

FIG. 4 is a block diagram representation of image mapping 400, according to an example embodiment. Image mapping 400 may be based on a received set of sequential captured traffic light images, here illustrated as traffic light diagrams 410. As shown in FIG. 4, the sequence of traffic light diagrams 410 together represent sequential images of a traffic signal.

Each of the sequential captured traffic light images may be mapped to a corresponding plurality of column vectors using a row-wise max operator and concatenated into a temporal image 420. For example, the leftmost column in temporal image 420 is the column vector that represents the output of the column-wise max operator applied to the first sequential image, and subsequent columns represent the progression of sequential captured traffic light images over time. Though only eight sequential diagrams 410 are shown to illustrate the changes in the traffic signal, a total of two hundred and sixty sequential captured traffic light images may be used to generate temporal image 420. The size of the generated temporal image 420 may be based on the resolution of the captured traffic light images. In the embodiment shown in FIG. 4, each of the sequential diagrams 410 represent an image that is eighty pixels in height by thirty pixels in width, each column vector is one pixel in width by eighty pixels in height, and the temporal image 430 is eighty pixels in height by two hundred and sixty pixels in width (one for each column vector). In some embodiments, the sampling frequency of the sequential captured traffic light images may be selected to be representative of each state, such as representative of each light change. For example, if the timing between red, red/yellow, and green states are known, then fewer than 240 images may be captured to identify a traffic light change.

Temporal image 420 may include multiple temporal sub-regions, such as region 430 where the red light is illuminated, region 440 where the red and yellow lights are illuminated, and region 450 where the green light is illuminated. While sequential diagrams 410 show a progression from red to red/yellow to green, other sequences may be detected, such as green to yellow to red to green. Additionally, while sequential diagrams 410 show a vertical traffic light orientation, the traffic light and sequential captured traffic light images may be received or captured horizontally, and the sequential diagrams 410 or resulting temporal image 420 may be rotated by ninety degrees. Temporal image 420 is subsequently fed into a CNN for signal classification, such as to identify the state or timing of a traffic signal.

Figure 5:
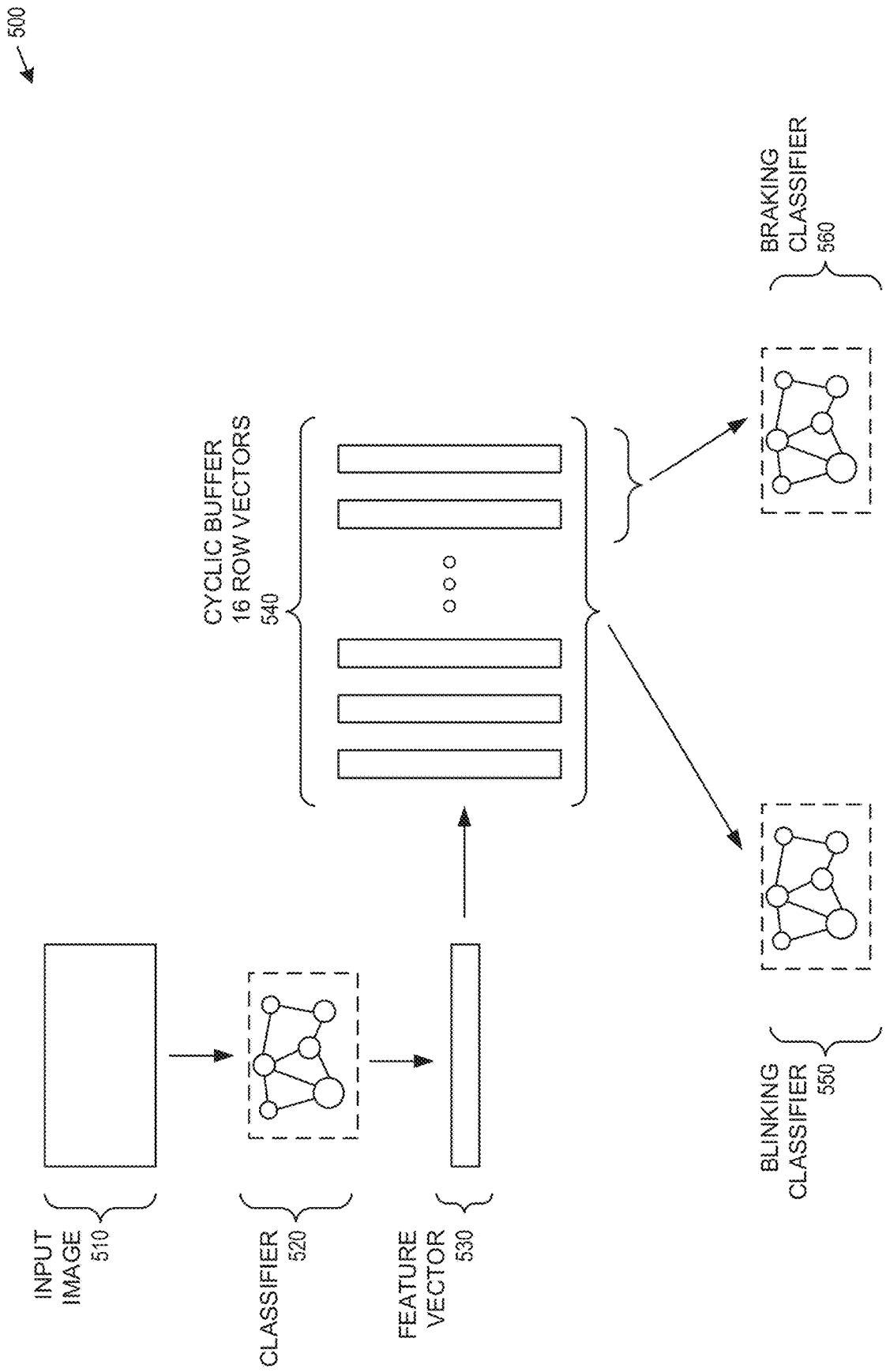
FIG. 5 is a block diagram representation of a system, according to an example embodiment.

FIG. 5 is a block diagram representation of image mapping 500, according to an example embodiment. Image mapping 500 may include a plurality of input images 510. The plurality of input images 510 may be transformed into a plurality of feature vectors 530 by a classifier 520. The classifier operates on a 64*64 pixel (e.g., redness and gray) warp and stores a 64-entry output feature vector. The plurality of feature vectors 530 may be concatenated into a feature vector map stored in a cyclic buffer 540. At least sixteen of the feature vectors 530 may be stored in a cyclic buffer 540. Data from the cyclic buffer 540 may be separated and used by a blinking classifier 550 or a braking classifier 560.

The blinking and braking classifiers 550, 560 may consist of a backbone network, that convert each image into a 64-entry sized feature vector. The backbone consists of convolutional and pooling layers with a final fully connected layer. The backbone features may include a braking classifier 560, which may include states of rise, fall, on, and off. The backbone features may include a blinking classifier 550, which may include states of blinking or braking signals: braking (e.g., rise, fall, on, off), blinking (e.g., right=on/off; left=on/off). The backbone features may include a combination of a blinking classifier 550 and a braking classifier 560, which may be used to identify combined states of blinking and braking signals. A braking classifier may be used to handle the two, most recent feature vectors of the cyclic buffer 540 from among the first sixteen feature vectors, which are received after the vehicle detection. In contrast, the blinking classifier 550 may be used to classify the most recent sixteen signals detected. The cyclic buffer 540 may be used to store a moving window of feature vectors 530, such that the most recent N feature vectors 530 are available to the blinking and braking classifiers 550, 560.

After training, the classification system may include at least three neural networks, including a backbone network, a braking network, and a blinking network. The backbone network may receive a set of pixels for each image. For example, the set of pixels may include a plurality of 64×64 pixels, with an effective axis of 50 pixels. This may include a plurality of vehicle images with at least two channels (e.g., redness, gray). The analysis of the backbone vector may result in a backbone vector, such as of length 64 pixels. The network may consist of a single hidden fully connected layer and an output layer with four neurons. Such a network may include an associated Maffe cost of approximately 3.6 k cycles.

In an example, the backbone network may include a Maffe cost of approximately 342 k cycles. This may be improved (e.g. lowered) with additional pruning. The braking classifier 560 may operate on the two most recent row vectors to produce probabilities, such as for identifying braking off, braking on, braking rise, or braking fall.

A blinking classifier 550 may operate on 16 row vectors to produce various probabilities. For example, each backbone may be reshaped to include a 1×16 horizontal vector with 4 channels. Each backbone may produce probabilities for one or more classification outputs, such as a left blink signal (e.g., on signal, off signal) or a right blink signal (e.g., on signal, off signal), a hazard signal (e.g., both turn signals blinking simultaneously), or a braking signal. In an example, the backbone may include a Maffe cost pf approximately 68 K per cycle.

At each cycle, the backbone may operate on a warp, such as a 64×64 warp (e.g., redness and gray). The backbone may store a sixty-four output vector in a cyclic buffer that holds the last 16 results. In an example, the buffer may represent 1.78 seconds in slow agenda. The last two vectors may be used for the input for the braking classifier 560. In an example, all of the 16 vectors are the input for the blinking classifier 550. In an example, the braking classifier 560 signals (e.g., rise, fall, on, and off) may be integrated over time using a hidden Markov model to produce a multiframe braking signal.

Figure 6:
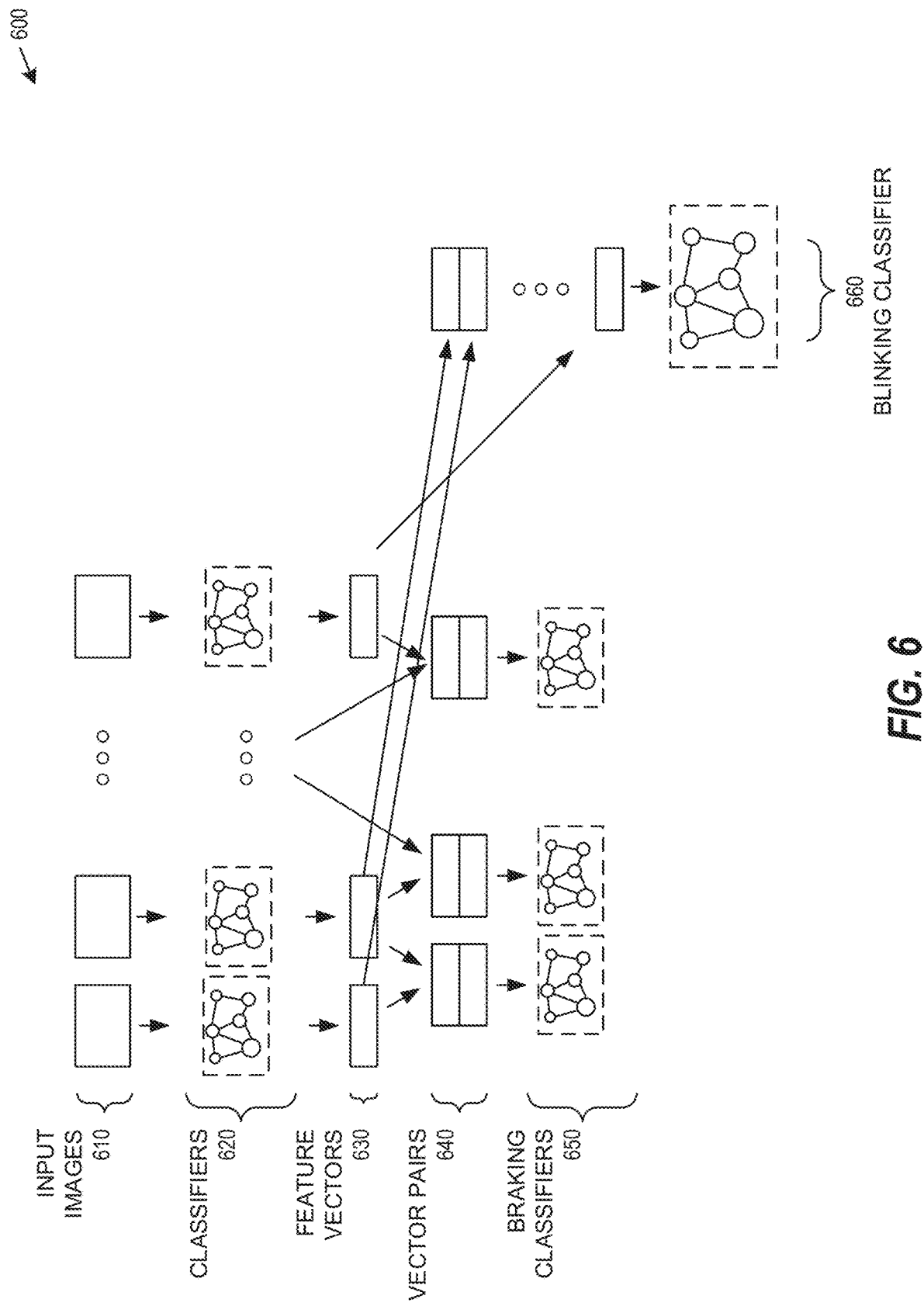
FIG. 6 is a block diagram representation of a system, according to an example embodiment.

FIG. 6 is a block diagram representation of shared image mapping 600, according to an example embodiment. Shared image mapping 600 may include training one or more classifiers, such as braking classifiers 660 or blinking classifiers 670. One or more of the classifiers may be trained on one or more sets of training warp data, such as a training warp. At train time, at least sixteen input images may be used as inputs to sixteen backbone networks with shared weights. In an example, sixteen classifiers 620 with shared weights may take the respective input image 610 and classify it to output a feature vector 630 of the image 610.

Feature vector pairs 640 are used as input to train braking classifiers 650. In an embodiment, feature vector pairs 640 are organized as the first and second, second and third, third and fourth, etc. until the feature vectors 630 are exhausted. This results in training N−1 braking classifiers for N input feature vectors (e.g., 16 input feature vectors has 15 pairs).

Feature vectors 630 are used to train the blinking classifier 660. In an embodiment, the feature vectors 630 of all input images 610 are used to train the blinking classifier 660. As such, in the example illustrated in FIG. 6, a total of 16 feature vectors 630 may be used as input to the blinking classifier 660.

Figure 7:
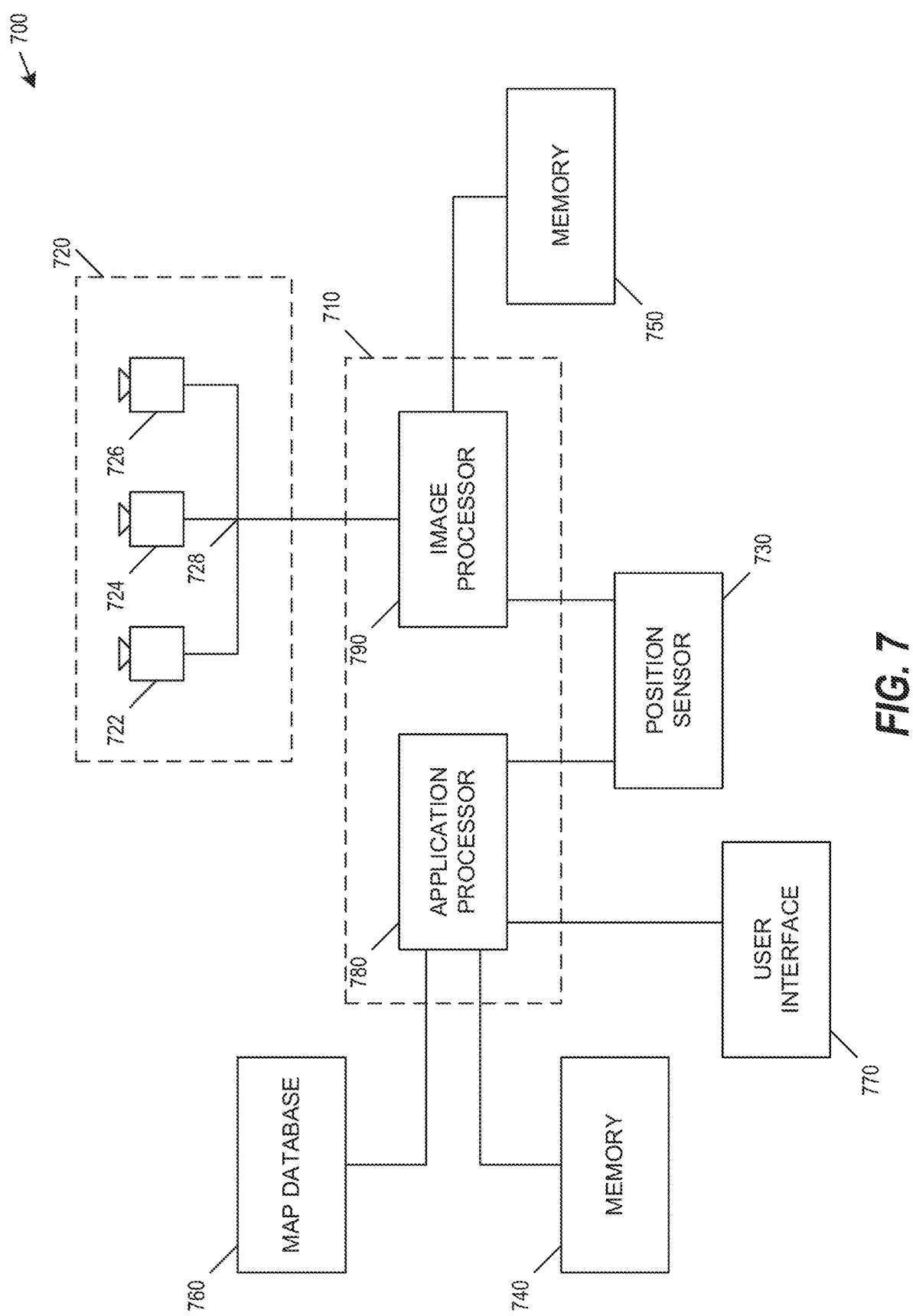
FIG. 7 is a block diagram representation of a system, according to an example embodiment.

FIG. 7 is a block diagram representation of a system 700, according to an example embodiment. System 700 can include various components depending on the requirements of a particular implementation. In some examples, system 700 can include a processing unit 710, an image acquisition unit 720 and one or more memory units 740, 750. Processing unit 710 can include one or more processing devices. In some embodiments, processing unit 710 can include an application processor 780, an image processor 790, or any other suitable processing device. Similarly, image acquisition unit 720 can include any number of image acquisition devices and components depending on the requirements of a particular application. In some embodiments, image acquisition unit 720 can include one or more image capture devices (e.g., cameras), such as image capture device 722, image capture device 724, and image capture device 726. In some embodiments, system 700 can also include a data interface 728 communicatively connecting processing unit 710 to image acquisition device 720. For example, data interface 728 can include any wired and/or wireless link or links for transmitting image data acquired by image acquisition device 720 to processing unit 710.

Both application processor 780 and image processor 790 can include various types of processing devices. For example, either or both of application processor 780 and image processor 790 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 780 and/or image processor 790 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 780 and/or image processor 790 can include any of the EyeQ series of processor chips available from Mobileye®. These processor designs each include multiple processing units with local memory and instruction sets. Such processors may include video inputs for receiving image data from multiple image sensors and may also include video out capabilities. While FIG. 7 depicts two separate processing devices included in processing unit 710, more or fewer processing devices can be used. For example, in some examples, a single processing device may be used to accomplish the tasks of application processor 780 and image processor 790. In other embodiments, these tasks can be performed by more than two processing devices.

Processing unit 710 can include various types of devices. For example, processing unit 710 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 710. In another instance, the memory can be integrated into the processing unit 710.

Each memory 740, 750 can include software instructions that when executed by a processor (e.g., application processor 780 and/or image processor 790), can control operation of various aspects of system 700. These memory units can include various databases and image processing software. The memory units can include random access memory, read only memory, flash memory, disk drives, optical storage, tape storage, removable storage, and/or any other types of storage. In some examples, memory units 740, 750 can be separate from the application processor 780 and/or image processor 790. In other embodiments, these memory units can be integrated into application processor 780 and/or image processor 790.

In some embodiments, the system can include a position sensor 730. The position sensor 730 can include any type of device suitable for determining a location associated with at least one component of system 700. In some embodiments, position sensor 730 can include a GPS receiver. Such receivers can determine a user position and velocity by processing signals broadcasted by global positioning system satellites. Position information from position sensor 730 can be made available to application processor 780 and/or image processor 790.

In some embodiments, the system 700 can be operatively connectible to various systems, devices and units onboard a vehicle in which the system 700 can be mounted, and through any suitable interfaces (e.g., a communication bus) the system 700 can communicate with the vehicle's systems. Examples of vehicle systems with which the system 700 can cooperate include: a throttling system, a braking system, and a steering system.

In some embodiments, the system 700 can include a user interface 770. User interface 770 can include any device suitable for providing information to or for receiving inputs from one or more users of system 700, including, for example, a touchscreen, microphone, keyboard, pointer devices, track wheels, cameras, knobs, buttons, etc. Information can be provided by the system 700, through the user interface 770, to the user.

In some embodiments, the system 700 can include a map database 760. The map database 760 can include any type of database for storing digital map data. In some examples, map database 760 can include data relating to a position, in a reference coordinate system, of various items, including roads, water features, geographic features, points of interest, etc. Map database 760 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 760 can be physically located with other components of system 700. Alternatively or additionally, map database 760 or a portion thereof can be located remotely with respect to other components of system 700 (e.g., processing unit 710). In such embodiments, information from map database 760 can be downloaded over a wired or wireless data connection to a network (e.g., over a cellular network and/or the Internet, etc.).

Image capture devices 722, 724, and 726 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices.

It would be appreciated that the system 700 can include or can be operatively associated with other types of sensors, including for example: an acoustic sensor, a RF sensor (e.g., radar transceiver), a LIDAR sensor. Such sensors can be used independently of or in cooperation with the image acquisition device 720. For example, the data from the radar system (not shown) can be used for validating the processed information that is received from processing images acquired by the image acquisition device 720, e.g., to filter certain false positives resulting from processing images acquired by the image acquisition device 720, or it can be combined with or otherwise compliment the image data from the image acquisition device 720, or some processed variation or derivative of the image data from the image acquisition device 720.

System 700, or various components thereof, can be incorporated into various different platforms. In some embodiments, system 700 may be included on a vehicle. For example, the vehicle can be equipped with a processing unit 710 and any of the other components of system 700, as described above relative to FIG. 7. While in some embodiments the vehicle can be equipped with only a single-image capture device (e.g., camera), multiple image capture devices can be used in other embodiments. For example, either of image capture devices 722 and 724 of the vehicle, can be part of an ADAS (Advanced Driver Assistance Systems) imaging set.

The image capture devices included on the vehicle as part of the image acquisition unit 720 can be positioned at any suitable location. In some embodiments, image capture device 722 can be located in the vicinity of the rearview mirror. This position may provide a line of sight similar to that of the driver of the vehicle, which can aid in determining what is and is not visible to the driver. Other locations for the image capture devices of image acquisition unit 720 can also be used. For example, image capture device 724 can be located on or in a bumper of the vehicle. Such a location can be especially suitable for image capture devices having a wide field of view. The line of sight of bumper-located image capture devices can be different from that of the driver. The image capture devices (e.g., image capture devices 722, 724, and 726) can also be located in other locations. For example, the image capture devices may be located on or in one or both of the side mirrors of the vehicle, on the roof of the vehicle, on the hood of the vehicle, on the trunk of the vehicle, on the sides of the vehicle, mounted on, positioned behind, or positioned in front of any of the windows of the vehicle, and mounted in or near light figures on the front and/or back of the vehicle, etc. The image capture unit 720, or an image capture device that is one of a plurality of image capture devices that are used in an image capture unit 720, can have a field-of-view (FOV) that is different than the FOV of a driver of the vehicle, and not always see the same objects. In one example, the FOV of the image acquisition unit 720 can extend beyond the FOV of a typical driver and can thus image objects which are outside the FOV of the driver. In yet another example, the FOV of the image acquisition unit 720 is some portion of the FOV of the driver. In some embodiments, the FOV of the image acquisition unit 720 corresponding to a sector which covers an area of a road ahead of the vehicle, surroundings of the road, or other areas.

In addition to image capture devices, the vehicle can include various other components of system 700. For example, processing unit 710 may be included on the vehicle either integrated with or separate from an engine control unit (ECU) of the vehicle. The vehicle may also be equipped with a position sensor 730, such as a GPS receiver and may also include a map database 760 and memory units 740 and 750.

To better illustrate the method and apparatuses disclosed herein, a non-limiting list of embodiments is provided here.

Example 1 is a system for fast CNN classification of multi-frame semantic signals, the system comprising: processing circuitry; and one or more storage devices comprising instructions, which when executed by the processing circuitry, configure the processing circuitry to: receive a plurality of time sequenced images from an image capture device; transform the plurality of time sequenced images to a plurality of vectors stored in a time-sequenced buffer; generate a temporal image based on the plurality of vectors; and generate a semantic signal based on an application of a convolutional neural network to the temporal image.

In Example 2, the subject matter of Example 1 optionally includes wherein each of a plurality of vectors includes a row vector of the same width as each of the plurality of time sequenced images.

In Example 3, the subject matter of Example 2 optionally includes wherein to transform the plurality of time sequenced images to the plurality of vectors, the processing circuitry is configured to calculate a column value for each of a plurality of columns within each of the plurality of time sequenced images.

In Example 4, the subject matter of any one or more of Examples 2-3 optionally include wherein calculating the column value includes at least one of calculating a mean value, a median value, or a maximal value for each of a plurality of columns within each of the plurality of time sequenced images.

In Example 5, the subject matter of any one or more of Examples 1-4 optionally include wherein the generation of the temporal image includes concatenating the plurality of vectors to form the temporal image.

In Example 6, the subject matter of any one or more of Examples 1-5 optionally include wherein to transform the plurality of time sequenced images to the plurality of vectors, the processing circuitry is configured to use a classifier to obtain each of the plurality of vectors from a respective plurality of images.

In Example 7, the subject matter of any one or more of Examples 1-6 optionally include wherein to generate the semantic signal based on the application of the convolutional neural network to the temporal image, the processing circuitry is configured to use a blinking classifier.

In Example 8, the subject matter of any one or more of Examples 1-7 optionally include wherein to generate the semantic signal based on the application of the convolutional neural network to the temporal image, the processing circuitry is configured to use a braking classifier.

In Example 9, the subject matter of any one or more of Examples 1-8 optionally include wherein to generate the semantic signal based on the application of the convolutional neural network to the temporal image, the processing circuitry is configured to use a braking classifier on a pair of vectors of the plurality of vectors, and to use a blinking classifier on the entire temporal image.

In Example 10, the subject matter of any one or more of Examples 1-9 optionally include wherein the braking classifier is trained for a plurality of braking signals.

In Example 11, the subject matter of any one or more of Examples 1-10 optionally include wherein the plurality of braking signals includes at least one of a braking on signal, a braking off signal, a braking rise signal, and a braking fall signal.

In Example 12, the subject matter of any one or more of Examples 1-11 optionally include wherein the blinking classifier is trained for a plurality of blinking signals.

In Example 13, the subject matter of any one or more of Examples 1-12 optionally include wherein the plurality of blinking signals includes at least one of a right blinking on signal, a right blinking off signal, a left blinking on signal, and a left blinking off signal.

In Example 14, the subject matter of any one or more of Examples 1-13 optionally include wherein: the image capture device is mounted on a vehicle; the semantic signal indicates a changed path condition for the vehicle; and the instructions further configure the processing circuitry to: identify a maneuver for the vehicle in response to the changed path condition; and send a vehicle control signal for execution of the maneuver.

In Example 15, the subject matter of any one or more of Examples 1-14 optionally include a vehicular control device to receive the control signal and execute the vehicular maneuver.

Example 16 is an autonomous navigation semantic signal method comprising: receiving a plurality of time sequenced images from an image capture device, each of the plurality of time sequenced images associated with a unique image capture time; mapping each of the plurality of time sequenced images to each of a plurality of vectors; converting the plurality of vectors to temporal image; and identifying a semantic signal based on applying a convolutional neural network to the temporal image.

In Example 17, the subject matter of Example 16 optionally includes capturing the plurality of time sequenced images; and associating the unique image capture time with each of the captured plurality of time sequenced images.

In Example 18, the subject matter of any one or more of Examples 16-17 optionally include wherein each of a plurality of vectors includes a row vector of the same width as each of the plurality of time sequenced images.

In Example 19, the subject matter of Example 18 optionally includes wherein mapping each of the plurality of time sequenced images to each of a plurality of vectors includes calculating a column value for each of a plurality of columns within each of the plurality of time sequenced images.

In Example 20, the subject matter of any one or more of Examples 18-19 optionally include wherein calculating the column value includes at least one of calculating a mean value, a median value, or a maximal value for each of a plurality of columns within each of the plurality of time sequenced images.

In Example 21, the subject matter of any one or more of Examples 16-20 optionally include wherein the generation of the temporal image includes concatenating the plurality of vectors to form the temporal image.

In Example 22, the subject matter of any one or more of Examples 16-21 optionally include wherein to transform the plurality of time sequenced images to the plurality of vectors, the processing circuitry is configured to use a classifier to obtain each of the plurality of vectors from a respective plurality of images.

In Example 23, the subject matter of any one or more of Examples 16-22 optionally include wherein to generate the semantic signal based on the application of the convolutional neural network to the temporal image, the processing circuitry is configured to use a blinking classifier.

In Example 24, the subject matter of any one or more of Examples 16-23 optionally include wherein to generate the semantic signal based on the application of the convolutional neural network to the temporal image, the processing circuitry is configured to use a braking classifier.

In Example 25, the subject matter of any one or more of Examples 16-24 optionally include wherein to generate the semantic signal based on the application of the convolutional neural network to the temporal image, the processing circuitry is configured to use a braking classifier on a pair of vectors of the plurality of vectors, and to use a blinking classifier on the entire temporal image.

In Example 26, the subject matter of any one or more of Examples 16-25 optionally include wherein the braking classifier is trained for a plurality of braking signals.

In Example 27, the subject matter of any one or more of Examples 16-26 optionally include wherein the plurality of braking signals includes at least one of a braking on signal, a braking off signal, a braking rise signal, and a braking fall signal.

In Example 28, the subject matter of any one or more of Examples 16-27 optionally include wherein the blinking classifier is trained for a plurality of blinking signals.

In Example 29, the subject matter of any one or more of Examples 16-28 optionally include wherein the plurality of blinking signals includes at least one of a right blinking on signal, a right blinking off signal, a left blinking on signal, and a left blinking off signal.

In Example 30, the subject matter of any one or more of Examples 16-29 optionally include identifying a vehicular maneuver based on the semantic signal; and sending a control signal to execute the vehicular maneuver to a vehicular control device.

Example 31 is one or more machine-readable medium including instructions, which when executed by a computing system, cause the computing system to perform any of the methods of Examples 16-30.

Example 32 is an apparatus comprising means for performing any of the methods of Examples 16-30.

Example 33 is a computer program product that stores instructions that, once executed by a computerized system, cause the computerized system to perform operations comprising: receiving a plurality of time sequenced images from an image capture device, each of the plurality of time sequenced images associated with a unique image capture time; mapping each of the plurality of time sequenced images to each of a plurality of vectors; converting the plurality of vectors to temporal image; and identifying a semantic signal based on applying a convolutional neural network to the temporal image.

In Example 34, the subject matter of Example 33 optionally includes capturing the plurality of time sequenced images; and associating the unique image capture time with each of the captured plurality of time sequenced images.

In Example 35, the subject matter of any one or more of Examples 33-34 optionally include wherein each of a plurality of vectors includes a row vector of the same width as each of the plurality of time sequenced images.

In Example 36, the subject matter of Example 35 optionally includes wherein mapping each of the plurality of time sequenced images to each of a plurality of vectors includes calculating a column value for each of a plurality of columns within each of the plurality of time sequenced images.

In Example 37, the subject matter of any one or more of Examples 35-36 optionally include wherein calculating the column value includes at least one of calculating a mean value, a median value, or a maximal value for each of a plurality of columns within each of the plurality of time sequenced images.

In Example 38, the subject matter of any one or more of Examples 33-37 optionally include wherein the generation of the temporal image includes concatenating the plurality of vectors to form the temporal image.

In Example 39, the subject matter of any one or more of Examples 33-38 optionally include wherein to transform the plurality of time sequenced images to the plurality of vectors, the processing circuitry is configured to use a classifier to obtain each of the plurality of vectors from a respective plurality of images.

In Example 40, the subject matter of any one or more of Examples 33-39 optionally include wherein to generate the semantic signal based on the application of the convolutional neural network to the temporal image, the processing circuitry is configured to use a blinking classifier.

In Example 41, the subject matter of any one or more of Examples 33-40 optionally include wherein to generate the semantic signal based on the application of the convolutional neural network to the temporal image, the processing circuitry is configured to use a braking classifier.

In Example 42, the subject matter of any one or more of Examples 33-41 optionally include wherein to generate the semantic signal based on the application of the convolutional neural network to the temporal image, the processing circuitry is configured to use a braking classifier on a pair of vectors of the plurality of vectors, and to use a blinking classifier on the entire temporal image.

In Example 43, the subject matter of any one or more of Examples 33-42 optionally include wherein the braking classifier is trained for a plurality of braking signals.

In Example 44, the subject matter of any one or more of Examples 33-43 optionally include wherein the plurality of braking signals includes at least one of a braking on signal, a braking off signal, a braking rise signal, and a braking fall signal.

In Example 45, the subject matter of any one or more of Examples 33-44 optionally include wherein the blinking classifier is trained for a plurality of blinking signals.

In Example 46, the subject matter of any one or more of Examples 33-45 optionally include wherein the plurality of blinking signals includes at least one of a right blinking on signal, a right blinking off signal, a left blinking on signal, and a left blinking off signal.

In Example 47, the subject matter of any one or more of Examples 33-46 optionally include identifying a vehicular maneuver based on the semantic signal; and sending a control signal to execute the vehicular maneuver to a vehicular control device.

Example 48 is a classification system comprising: memory with instructions, which when executed by a processing unit, cause the processing unit to implement a classification trainer including: a backbone network to convert a plurality of images into a feature vector; a braking network to produce probabilities for each of a plurality of braking signals; and a blinking network to produce probabilities for each of a plurality of blinking signals.

In Example 49, the subject matter of Example 48 optionally includes wherein the backbone network includes a convolutional layer, a pooling layer, and a fully connected layer.

In Example 50, the subject matter of any one or more of Examples 48-49 optionally include wherein: the plurality of images include a plurality of two-channel vehicle images; and the backbone network converts the plurality of images into a sixty-four length feature vector.

In Example 51, the subject matter of any one or more of Examples 48-50 optionally include wherein: a set of two backbone features are classified for the plurality of braking signals; and a set of sixteen backbone features are classified for the plurality of braking signals and the plurality of blinking signals.

In Example 52, the subject matter of any one or more of Examples 48-51 optionally include wherein: the set of two backbone features are classified for a first subset of sixteen frames received upon a detection of a vehicle; and the set of sixteen backbone features are classified when at least a full set of sixteen frames have been received.

In Example 53, the subject matter of any one or more of Examples 48-52 optionally include wherein the braking network includes a single hidden fully connected layer and an output layer with four neurons.

In Example 54, the subject matter of any one or more of Examples 48-53 optionally include wherein the braking network operates on two row vectors to produce the probabilities for each of the plurality of braking signals.

In Example 55, the subject matter of any one or more of Examples 48-54 optionally include wherein the plurality of braking signals includes at least one of a braking on signal, a braking off signal, a braking rise signal, and a braking fall signal.

In Example 56, the subject matter of any one or more of Examples 48-55 optionally include wherein the blinking network operates on sixteen row vectors to produce the probabilities for each of the plurality of blinking signals.

In Example 57, the subject matter of any one or more of Examples 48-56 optionally include wherein the sixteen row vectors include a reshaped set of sixteen backbone features, the reshaped set of sixteen backbone features including one sixteen-length horizontal vector and four channels.

In Example 58, the subject matter of any one or more of Examples 48-57 optionally include wherein the plurality of blinking signals includes at least one of a right blinking on signal, a right blinking off signal, a left blinking on signal, and a left blinking off signal.

Example 59 is a classification method comprising: training a classification trainer, the classification trainer including: a backbone network to convert a plurality of images into a feature vector; a braking network to produce probabilities for each of a plurality of braking signals; and a blinking network to produce probabilities for each of a plurality of blinking signals.

In Example 60, the subject matter of Example 59 optionally includes wherein the backbone network includes a convolutional layer, a pooling layer, and a fully connected layer.

In Example 61, the subject matter of any one or more of Examples 59-60 optionally include wherein: the plurality of images include a plurality of two-channel vehicle images; and the backbone network converts the plurality of images into a sixty-four length feature vector.

In Example 62, the subject matter of any one or more of Examples 59-61 optionally include wherein: a set of two backbone features are classified for the plurality of braking signals; and a set of sixteen backbone features are classified for the plurality of braking signals and the plurality of blinking signals.

In Example 63, the subject matter of any one or more of Examples 59-62 optionally include wherein: the set of two backbone features are classified for a first subset of sixteen frames received upon a detection of a vehicle; and the set of sixteen backbone features are classified when at least a full set of sixteen frames have been received.

In Example 64, the subject matter of any one or more of Examples 59-63 optionally include wherein the braking network includes a single hidden fully connected layer and an output layer with four neurons.

In Example 65, the subject matter of any one or more of Examples 59-64 optionally include wherein the braking network operates on two row vectors to produce the probabilities for each of the plurality of braking signals.

In Example 66, the subject matter of any one or more of Examples 59-65 optionally include wherein the plurality of braking signals includes at least one of a braking on signal, a braking off signal, a braking rise signal, and a braking fall signal.

In Example 67, the subject matter of any one or more of Examples 59-66 optionally include wherein the blinking network operates on sixteen row vectors to produce the probabilities for each of the plurality of blinking signals.

In Example 68, the subject matter of any one or more of Examples 59-67 optionally include wherein the sixteen row vectors include a reshaped set of sixteen backbone features, the reshaped set of sixteen backbone features including one sixteen-length horizontal vector and four channels.

In Example 69, the subject matter of any one or more of Examples 59-68 optionally include wherein the plurality of blinking signals includes at least one of a right blinking on signal, a right blinking off signal, a left blinking on signal, and a left blinking off signal.

Example 70 is a computer program product that stores instructions that, once executed by a computerized system, cause the computerized system to perform operations comprising: training a classification trainer, the classification trainer including: a backbone network to convert a plurality of images into a feature vector; a braking network to produce probabilities for each of a plurality of braking signals; and a blinking network to produce probabilities for each of a plurality of blinking signals.

In Example 71, the subject matter of Example 70 optionally includes wherein the backbone network includes a convolutional layer, a pooling layer, and a fully connected layer.

In Example 72, the subject matter of any one or more of Examples 70-71 optionally include wherein: the plurality of images include a plurality of two-channel vehicle images; and the backbone network converts the plurality of images into a sixty-four length feature vector.

In Example 73, the subject matter of any one or more of Examples 70-72 optionally include wherein: a set of two backbone features are classified for the plurality of braking signals; and a set of sixteen backbone features are classified for the plurality of braking signals and the plurality of blinking signals.

In Example 74, the subject matter of any one or more of Examples 70-73 optionally include wherein: the set of two backbone features are classified for a first subset of sixteen frames received upon a detection of a vehicle; and the set of sixteen backbone features are classified when at least a full set of sixteen frames have been received.

In Example 75, the subject matter of any one or more of Examples 70-74 optionally include wherein the braking network includes a single hidden fully connected layer and an output layer with four neurons.

In Example 76, the subject matter of any one or more of Examples 70-75 optionally include wherein the braking network operates on two row vectors to produce the probabilities for each of the plurality of braking signals.

In Example 77, the subject matter of any one or more of Examples 70-76 optionally include wherein the plurality of braking signals includes at least one of a braking on signal, a braking off signal, a braking rise signal, and a braking fall signal.

In Example 78, the subject matter of any one or more of Examples 70-77 optionally include wherein the blinking network operates on sixteen row vectors to produce the probabilities for each of the plurality of blinking signals.

In Example 79, the subject matter of any one or more of Examples 70-78 optionally include wherein the sixteen row vectors include a reshaped set of sixteen backbone features, the reshaped set of sixteen backbone features including one sixteen-length horizontal vector and four channels.

In Example 80, the subject matter of any one or more of Examples 70-79 optionally include wherein the plurality of blinking signals includes at least one of a right blinking on signal, a right blinking off signal, a left blinking on signal, and a left blinking off signal.

Example 81 is one or more machine-readable medium including instructions, which when executed by a machine, cause the machine to perform operations of any of the operations of Examples 1-80.

Example 82 is an apparatus comprising means for performing any of the operations of Examples 1-80.

Example 83 is a system to perform the operations of any of the Examples 1-80.

Example 84 is a method to perform the operations of any of the Examples 1-80.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Any reference to a system should be applied mutatis mutandis to a method that is executed by a system and/or to a computer program product that stores instructions that once executed by the system will cause the system to execute the method. The computer program product is non-transitory and may be, for example, an integrated circuit, a magnetic memory, an optical memory, a disk, and the like.

Any reference to method should be applied mutatis mutandis to a system that is configured to execute the method and/or to a computer program product that stores instructions that once executed by the system will cause the system to execute the method.

Any reference to a computer program product should be applied, mutatis mutandis to a method that is executed by a system and/or a system that is configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including," "comprising," "having," "consisting" and "consisting essentially of" are used in an interchangeable manner. For example—any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system that is illustrated in any of the figures and/or specification and/or the claims may be provided. Any combination of any system illustrated in any of the figures and/or specification and/or the claims may be provided. Any combination of steps, operations and/or methods illustrated in any of the figures and/or specification and/or the claims may be provided. Any combination of operations illustrated in any of the figures and/or specification and/or the claims may be provided. Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system comprising:
   processing circuitry; and
   one or more storage devices comprising instructions, which when executed by the processing circuitry, configure the processing circuitry to:
   transform a plurality of time sequenced images received from an image capture device to a plurality of vectors stored in a time-sequenced data structure; and
   generate a semantic signal based on an application of a convolutional neural network to a temporal image, the temporal image generated based on the plurality of vectors;

wherein each of the plurality of vectors includes a row vector of the same width as each of the plurality of time sequenced images.

2. The system of claim 1, wherein to transform the plurality of time sequenced images to the plurality of vectors, the processing circuitry is configured to calculate a column value for each of a plurality of columns within each of the plurality of time sequenced images.

3. The system of claim 2, wherein calculating the column value includes at least one of calculating a mean value, a median value, or a maximal value for each of a plurality of columns within each of the plurality of time sequenced images.

4. The system of claim 1, wherein the generation of the temporal image includes concatenating the plurality of vectors to form the temporal image.

5. The system of claim 1, wherein to transform the plurality of time sequenced images to the plurality of vectors, the processing circuitry is configured to use a classifier to obtain each of the plurality of vectors from a respective plurality of images.

6. The system of claim 1, wherein identifying the semantic signal based on application of the convolutional neural network to the temporal image, the processing circuitry is configured to use a blinking classifier.

7. The system of claim 1, wherein identifying the semantic signal based on application of the convolutional neural network to the temporal image, the processing circuitry is configured to use a braking classifier.

8. The system of claim 1, wherein identifying the semantic signal based on application of the convolutional neural network to the temporal image, the processing circuitry is configured to use a braking classifier on a pair of vectors of the plurality of vectors, and to use a blinking classifier on the entire temporal image.

9. The system of claim 8, wherein the braking classifier is trained for a plurality of braking signals.

10. The system of claim 1, wherein:
the image capture device is mounted on a vehicle;
the semantic signal indicates a changed path condition for the vehicle; and
the instructions further configure the processing circuitry to:
identify a maneuver for the vehicle in response to the changed path condition; and
send a vehicle control signal for execution of the maneuver.

11. The system of claim 10, further including a vehicular control device to receive the control signal and execute the maneuver for the vehicle.

12. An autonomous navigation semantic signal method comprising:
mapping each of a plurality of time sequenced images received from an image capture device to each of a plurality of vectors; and
identifying a semantic signal based on applying a convolutional neural network to a temporal image, the temporal image generated based on the plurality of vectors;
wherein each of the plurality of vectors includes a row vector of the same width as each of the plurality of time sequenced images.

13. The method of claim 12, further including:
capturing the plurality of time sequenced images; and
associating a unique image capture time with each of the captured plurality of time sequenced images.

14. The method of claim 12, wherein mapping each of the plurality of time sequenced images to each of a plurality of vectors includes calculating a column value for each of a plurality of columns within each of the plurality of time sequenced images.

15. The method of claim 14, wherein calculating the column value includes at least one of calculating a mean value, a median value, or a maximal value for each of a plurality of columns within each of the plurality of time sequenced images.

16. The method of claim 12, wherein the temporal image includes a concatenation of the plurality of vectors to form the temporal image.

17. The method of claim 12, wherein mapping each of the plurality of time sequenced images to the plurality of vectors includes using a classifier to obtain each of the plurality of vectors from a respective plurality of images.

18. The method of claim 12, wherein identifying the semantic signal based on application of the convolutional neural network to the temporal image includes using a blinking classifier.

19. The method of claim 12, wherein identifying the semantic signal based on application of the convolutional neural network to the temporal image includes using a braking classifier.

20. The method of claim 12, wherein identifying the semantic signal based on application of the convolutional neural network to the temporal image includes using a braking classifier on a pair of vectors of the plurality of vectors and using a blinking classifier on the entire temporal image.

21. The method of claim 12, further including:
identifying a vehicular maneuver based on the semantic signal; and
sending a control signal to execute the vehicular maneuver to a vehicular control device.

22. A non-transitory computer program product that stores instructions that, once executed by a computerized system, cause the computerized system to perform operations comprising:
mapping each of a plurality of time sequenced images received from an image capture device to each of a plurality of vectors;
identifying a semantic signal based on applying a convolutional neural network to a temporal image, the temporal image generated based on the plurality of vectors;
wherein each of the plurality of vectors includes a row vector of the same width as each of the plurality of time sequenced images.

23. The non-transitory computer program product of claim 22, wherein to transform the plurality of time sequenced images to the plurality of vectors includes using a classifier to obtain each of the plurality of vectors from a respective plurality of images.

24. The non-transitory computer program product of claim 22, wherein identifying the semantic signal based on application of the convolutional neural network to the temporal image includes using a braking classifier on a pair of vectors of the plurality of vectors, and to use a blinking classifier on the entire temporal image.

25. The non-transitory computer program product of claim 22, further including:
identifying a vehicular maneuver based on the semantic signal; and
sending a control signal to execute the vehicular maneuver to a vehicular control device.

* * * * *